United States Patent
Zhu et al.

(10) Patent No.: US 11,899,147 B2
(45) Date of Patent: Feb. 13, 2024

(54) METHOD AND SYSTEM FOR SEISMIC DENOISING USING OMNIFOCAL REFORMATION

(71) Applicant: SAUDI ARABIAN OIL COMPANY, Dhahran (SA)

(72) Inventors: Weihong Zhu, Dhahran (SA); Hussain I. Hammad, Tarut (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 254 days.

(21) Appl. No.: 17/400,923

(22) Filed: Aug. 12, 2021

(65) Prior Publication Data

US 2023/0047037 A1     Feb. 16, 2023

(51) Int. Cl.
*G01V 1/30*     (2006.01)
*G01V 1/28*     (2006.01)

(52) U.S. Cl.
CPC ............. *G01V 1/30* (2013.01); *G01V 1/282* (2013.01); *G01V 2210/1295* (2013.01);
(Continued)

(58) Field of Classification Search
CPC . G01V 1/30; G01V 1/36; G01V 1/282; G01V 2210/1295; G01V 2210/1425; G01V 2210/32; G01V 2210/65; G01V 2210/66
See application file for complete search history.

(56) References Cited

U.S. PATENT DOCUMENTS 5,103,429 A     4/1992     Gelchinsky
5,587,967 A *    12/1996     Ferber .................... G01V 1/303
                                                                                     702/14
(Continued)

FOREIGN PATENT DOCUMENTS

GB     2591169 A    *    7/2021    .......... E21B 47/022
GB     2591169 A         7/2021
(Continued)

OTHER PUBLICATIONS

Berkovitch et al.; "Multifocusing as a method of improving subsurface imaging"; The Leading Edge; vol. 27; Issue 2; Feb. 2008; pp. 250-256 (6 pages).
(Continued)

*Primary Examiner* — John E Breene
*Assistant Examiner* — Yaritza H Perez Bermudez
(74) *Attorney, Agent, or Firm* — Osha Bergman Watanabe & Burton LLP

(57) ABSTRACT

Methods and systems for determining an image of a subterranean region of interest are disclosed. The method includes obtaining a seismic dataset and a geological dip model for the subterranean region of interest and determining a set of input seismic gathers from the seismic dataset. The method further includes determining a central seismic gather and a set of neighboring seismic gathers in a vicinity of the central seismic gather from the set of seismic gathers, determining a set of dip-corrected neighboring seismic gathers based, at least in part, on the set of neighboring seismic gathers and a geological dip from the geological dip model, and determining a noise-attenuated central seismic gather by combining the dip-corrected neighboring seismic gathers and the central seismic gather. The method still further includes forming the image of the subterranean region of interest based, at least in part, on the noise-attenuated central seismic gather.

18 Claims, 10 Drawing Sheets

(52) U.S. Cl.
CPC .. *G01V 2210/1425* (2013.01); *G01V 2210/32* (2013.01); *G01V 2210/65* (2013.01); *G01V 2210/66* (2013.01)

(56) References Cited

U.S. PATENT DOCUMENTS

| | | | |
|---|---|---|---|
| 5,596,547 | A | 1/1997 | Bancroft et al. |
| 6,952,379 | B2 | 10/2005 | Daube et al. |
| 7,630,865 | B2 | 12/2009 | Berkovitch et al. |
| 8,185,316 | B2 | 5/2012 | Alam et al. |
| 8,209,125 | B2 | 6/2012 | Berkovitch et al. |
| 9,482,770 | B2 * | 11/2016 | Sun .......... G01V 1/30 |
| 9,671,512 | B2 | 6/2017 | Sun et al. |
| 9,864,084 | B2 | 1/2018 | Poole |
| 10,036,821 | B2 | 7/2018 | Corcoran et al. |
| 10,641,916 | B2 | 5/2020 | Ozbek et al. |
| 10,768,327 | B2 | 9/2020 | Haacke et al. |
| 2010/0131205 | A1 | 5/2010 | Berkovitch et al. |
| 2012/0241166 | A1 * | 9/2012 | Sun .......... G01V 1/30 367/52 |
| 2013/0194893 | A1 * | 8/2013 | Nagarajappa .......... G01V 1/364 367/43 |
| 2014/0019057 | A1 | 1/2014 | Diller |
| 2015/0063064 | A1 | 3/2015 | van Groenestjin |
| 2017/0176616 | A1 * | 6/2017 | Sun .......... G01V 1/362 |
| 2017/0199289 | A1 * | 7/2017 | Peng .......... G01V 1/307 |
| 2017/0248716 | A1 | 8/2017 | Poole |
| 2018/0364380 | A1 | 12/2018 | Bekara et al. |
| 2019/0331815 | A1 | 10/2019 | Zhang |
| 2020/0191985 | A1 | 6/2020 | Kristiansen et al. |
| 2021/0026029 | A1 | 1/2021 | Poole |
| 2021/0063570 | A1 * | 3/2021 | Liu .......... G01V 1/362 |
| 2021/0302606 | A1 * | 9/2021 | Al-Saleh .......... G01V 1/282 |
| 2022/0413172 | A1 * | 12/2022 | Gashawbeza .......... G01V 1/282 |

FOREIGN PATENT DOCUMENTS

| | | | |
|---|---|---|---|
| WO | 02/059648 | A1 | 8/2002 |
| WO | WO-02059648 | A1 * | 8/2002 .......... G01V 1/303 |

OTHER PUBLICATIONS

Borghi et al.; "Sierra de Reyes 3D seismic survey (onshore Argentina): depth imaging complex geology by applying multi-focusing, Kirchoff, Beam and RTM workflows"; First Break; vol. 35; Issue 2; Dec. 1, 2017; pp. 67-76 (10 pages).

Curia et al.; "The impact of multifocusing in the processing of land 3D seismic data in a fol and thrust belt setting: Ranquil Norte Block, Neuquen Basin, Argentina"; The Leading Edge; vol. 36; Issue 9; Sep. 1, 2017; pp. 770-774 (5 pages).

Gelchinsky et al.; "Multifocusing homeomorphic imaging: Part 1. Basic concepts and formulas", Journal of Applied Geophyics; vol. 42; Issues 3-4; Dec. 1999; pp. 229-242 (14 pages).

Landa et al.; "Multifocusing revisited—inhomogeneous media and curved interfaces"; Geophysical Prospecting; vol. 58; Issue 6; Dec. 2010; pp. 925-938 (14 pages).

Garabito et al.; "Part II—CRS-beam PSDM: Kirchoff-beam prestack depth migration using the 2D CRS stacking operator"; Journal of Applied Geophysics; vol. 85; Oct. 2012; pp. 102-110 (9 pages).

Hertweck et al.; "Data stacking beyond CMP"; The Leading Edge; vol. 26; Issue 7; Jul. 2007; pp. 818-827 (10 pages).

Walda et al.; "A competitive comparison of multiparameter stacking operators"; vol. 82; Issue 4; Jul. 2017 (11 pages).

Baykulov, M. and Gajewski, D.; "Prestack Seismic Data Enhancement With Partial Common Reflection Surface (CRS) Stack"; Geophysics; vol. 74; No. 3; May 1, 2009; pp. V49-V58 (10 pages).

Birgin et al.; "Restricted optimization: a clue to a fast and accurate implementation of the Common Reflection Surface Stack method"; Journal of Applied Geophysics; vol. 42; Issues 3-4; Dec. 1999; pp. 143-155 (13 pages).

Mann et al.; "Common-reflection-surface stack—a real data example"; Journal of Applied Geophysics; vol. 42; Issues 3-4; Dec. 1999; pp. 301-318 (18 pages).

Zhang et al.; "Common-reflection-surface (CRS) stack for common offset"; Geophysical Prospecting; vol. 49; Issue 6; Nov. 2001; pp. 709-718 (10 pages).

Jäger et al.; "Common-reflection-surface stack: Image and Attributes"; Geophysics; vol. 66; No. 1; Jan. 1, 2001; pp. 97-109 (13 pages).

Garabito et al.; "Part II—CRS-beam PSDM: Kirchhoff-beam prestack depth migration using the 2D CRS stacking operator"; Journal of Applied Geophysics; vol. 85; Jul. 2012; pp. 102-110 (9 pages).

International Search Report and Written Opinion of the International Searching Authority issued in corresponding International Application No. PCT/US2022/040249; dated Nov. 21, 2022 (13 pages).

Van Avendonk, Harm J. A. et al., "Slowness-weighted diffraction stack for migrating wide-angle seismic data in laterally varying media"; Geophysics; vol. 69, Issue 4; pp. 1046-1052; Jul.-Aug. 2004 (7 pages).

* cited by examiner

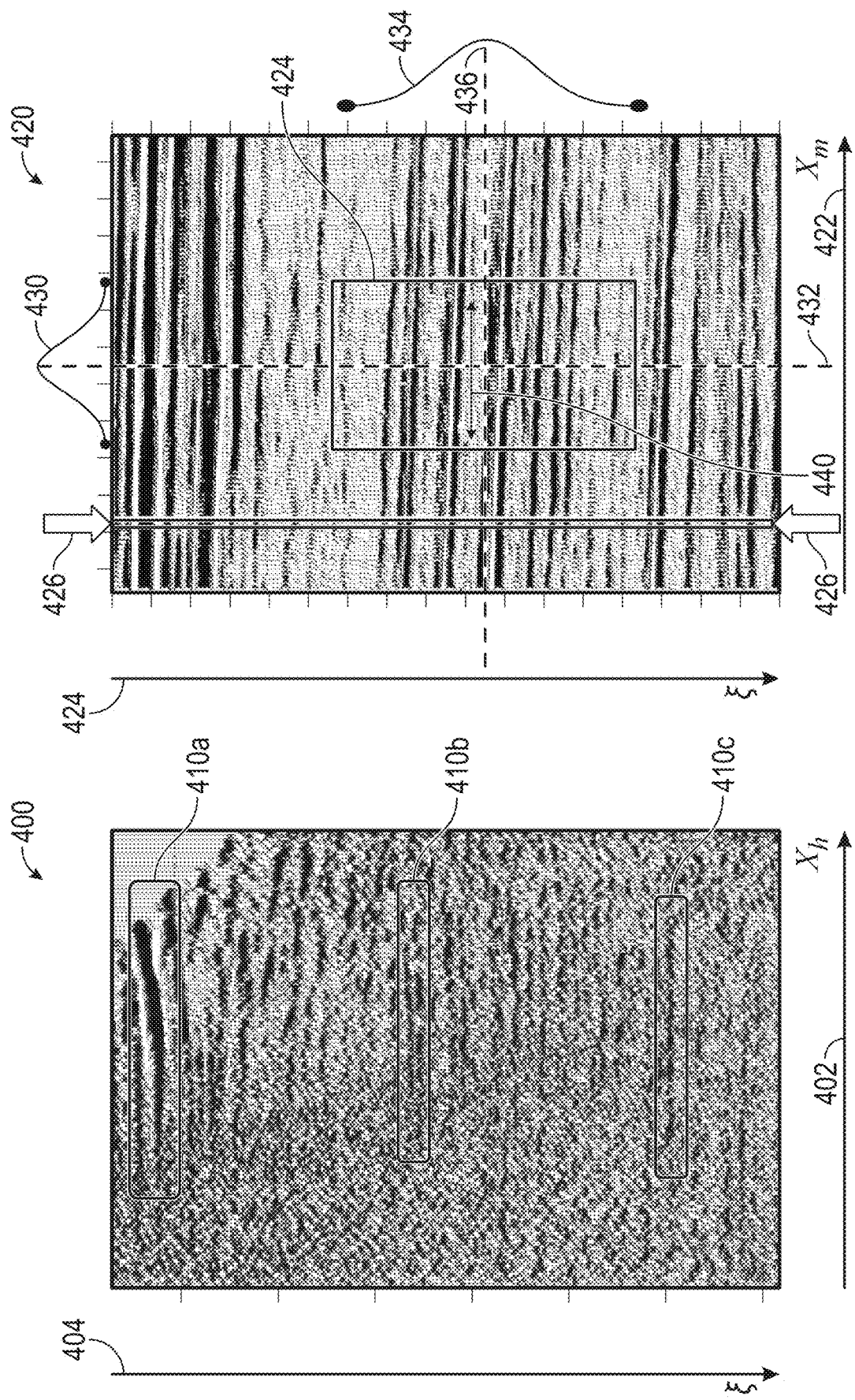

METHOD AND SYSTEM FOR SEISMIC DENOISING USING OMNIFOCAL REFORMATION

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry, calculate a seismic velocity model, image reflectors in the subterranean, calculate a plurality of seismic attributes to characterize the subterranean region of interest, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for determining an image of a subterranean region of interest are disclosed. The method includes obtaining a seismic dataset and a geological dip model for the subterranean region of interest and determining a set of input seismic gathers from the seismic dataset. The method further includes determining a central seismic gather and a set of neighboring seismic gathers in a vicinity of the central seismic gather from the set of seismic gathers, determining a set of dip-corrected neighboring seismic gathers based, at least in part, on the set of neighboring seismic gathers and a geological dip from the geological dip model, and determining a noise-attenuated central seismic gather by combining the dip-corrected neighboring seismic gathers and the central seismic gather. The method still further includes forming the image of the subterranean region of interest based, at least in part, on the noise-attenuated central seismic gather.

In general, in one aspect, embodiments relate to a non-transitory computer readable medium storing instructions executable by a computer processor, the instructions include functionality for determining an image of a subterranean region of interest are disclosed. The instructions include functionality for obtaining a seismic dataset and a geological dip model for the subterranean region of interest and determining asset of input seismic gathers from the seismic dataset. The instructions further include functionality for determining a central seismic gather and a set of neighboring seismic gathers in a vicinity of the central seismic gather from the set of seismic gathers, determining a set of dip-corrected neighboring seismic gathers based, at least in part, on the set of neighboring seismic gathers and a geological dip from the geological dip model, and determining a noise-attenuated central seismic gather by combining the dip-corrected neighboring seismic gathers and the central seismic gather. The instructions still further include functionality for still further includes forming the image of the subterranean region of interest based, at least in part, on the noise-attenuated central seismic gather.

In general, in one aspect, embodiments relate to a system for forming an image of a subterranean region of interest. The system includes a seismic source to emit a radiated seismic wave, a plurality of seismic receivers for detecting and recording an observed seismic dataset generated by the radiated seismic wave, and a seismic processor. The seismic processor is configured to receive a seismic dataset and a geological dip model for the subterranean region of interest and determine asset of input seismic gathers from the seismic dataset. The seismic processor is further configured to determine a central seismic gather and a set of neighboring seismic gathers in a vicinity of the central seismic gather from the set of seismic gathers, determine a set of dip-corrected neighboring seismic gathers based, at least in part, on the set of neighboring seismic gathers and a geological dip from the geological dip model, and determine a noise-attenuated central seismic gather by combining the dip-corrected neighboring seismic gathers and the central seismic gather. The seismic processor is still further configured to form the image of the subterranean region of interest based, at least in part, on the noise-attenuated central seismic gather.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 4A and 4B show seismic data sets in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Seismic data, including seismic mid-point gathers, may exhibit noise as well as seismic signals. It is desirable to attenuate noise to improve the accuracy and resolution of seismic images generated from the seismic data and facilitate the planning of wellbore trajectories. Noise exhibited on seismic mid-point gathers may be attenuated by combining adjacent mid-point gathers. Enclosed embodiments disclose methods of generating a noise attenuated mid-point gather by combining a plurality of adjacent mid-point gathers after first correcting them for geological dip at the location of the generated noise attenuated mid-point gather.

Figure 1:
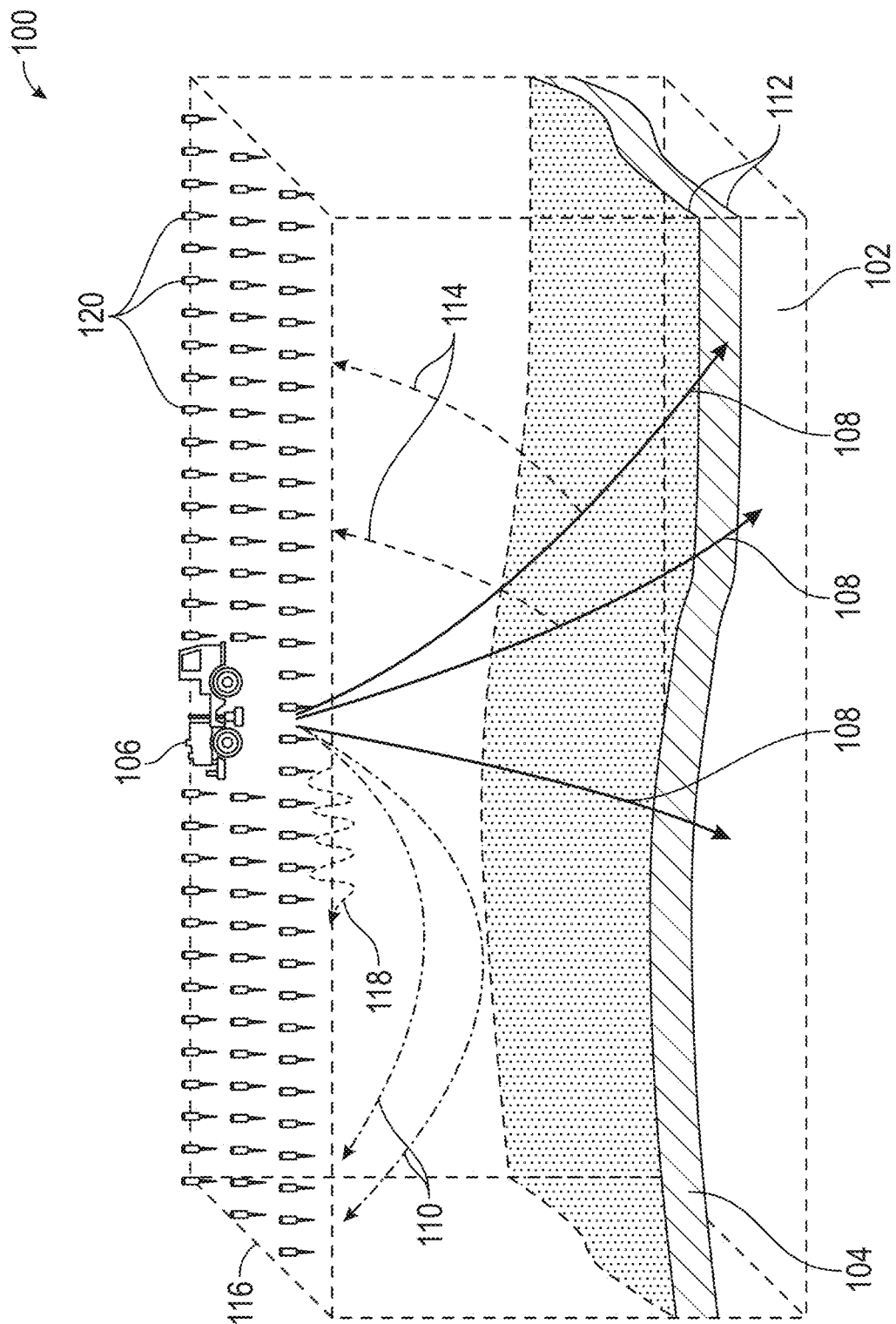
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the Earth's surface (116) as refracted seismic waves (110) or may be reflected by geological discontinuities (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the Earth's surface (116) and hence are not influenced, nor contain information about, portions of the subterranean region of interest (102) where hydrocarbon reservoirs (104) are typically located. Seismic receivers (120) located on or near the Earth's surface (116) detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The origin of a seismic trace may be taken as the earliest time sample and zero amplitude point. The seismic receivers (120) are positioned at a plurality of seismic receiver locations which we may denote $(x_r, y_r)$ where x and y represent orthogonal axes on the Earth's surface (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (116) and t denotes the time sample at which the amplitude of ground-motion was measured.

However, a seismic survey (100) may include recordings of seismic waves generated by a seismic source (106) sequentially activated at a plurality of seismic source locations denoted $(x_s, y_s)$. In some cases, this may be achieved using a single seismic source (106) that is moved to a new location between activations. In other cases, a plurality of seismic sources (106) positioned at different locations may be used. Irrespective of how they are acquired, all the seismic traces acquired by a seismic survey (100) may be represented as a five-dimensional volume, with coordinate axes $(x_s, y_s, x_r, y_r, t)$, and called a "seismic dataset".

Figure 2:
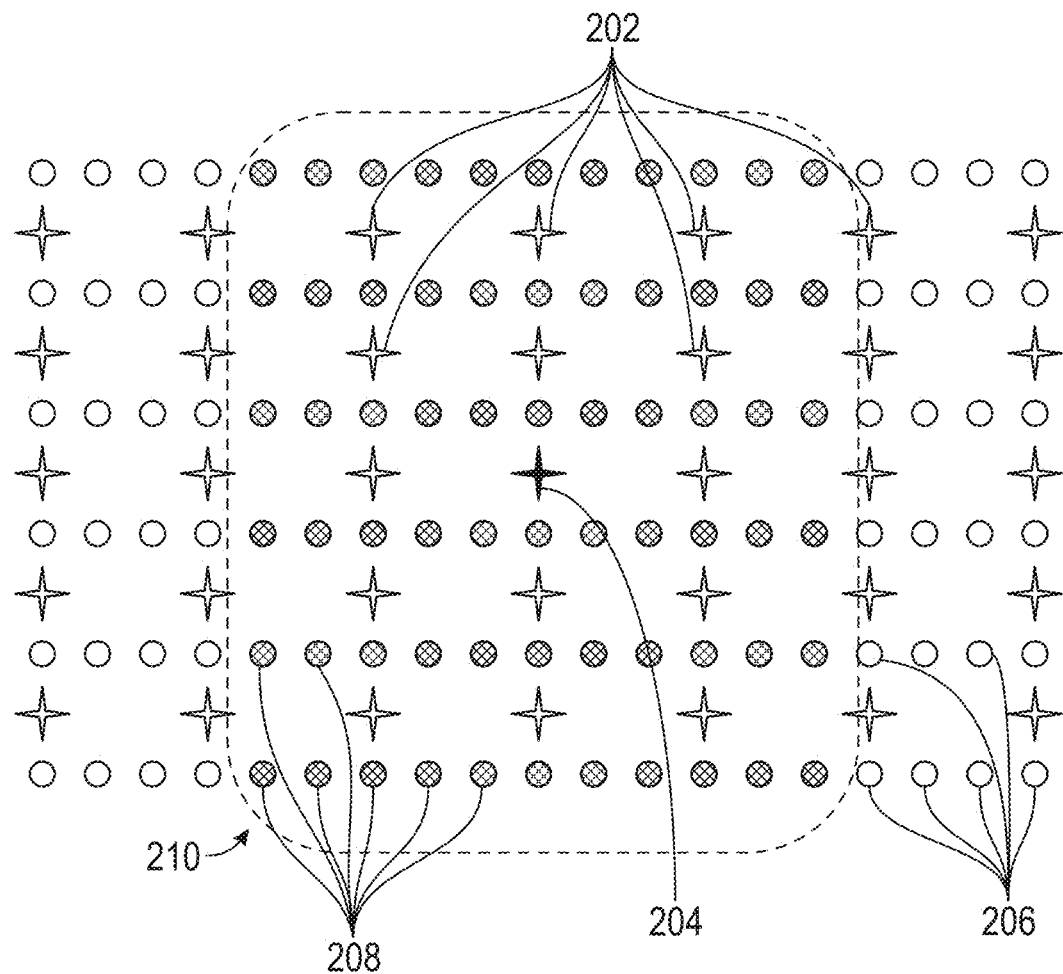
FIG. 2 shows a seismic recording geometry in accordance with one or more embodiments.

FIG. 2 depicts the geometry of a seismic survey in accordance with one or more embodiments. The seismic survey may include a plurality of source locations (202, 204), depicted in FIG. 2 by crosses, and a plurality of seismic receiver locations (206, 208), depicted in FIG. 2A by circles. The seismic source locations (202, 204) and the seismic receiver locations (206, 208) may be arranged on a regular grid, in accordance with some embodiments, and may be arranged on an irregular grid in accordance with other embodiments.

The seismic waves radiated by the activation of a seismic source at a single location (204), represented in FIG. 2 as a filled cross, may be recorded at all the seismic receiver locations (206, 208) in accordance with one or more embodiments or may be recorded at a portion of the seismic receiver location (208) in accordance with other embodiments. In particular, the seismic waves radiated by the activation of a seismic source at a single location (204) may be recorded at the seismic receiver locations (208), indicated in FIG. 2 by filled circles, in a neighborhood ("patch") (210) surrounding location of the activated seismic source (204). The patch (210) of locations at which the seismic waves radiated by the activation of a seismic source are recorded may move spatially as the location of the activated seismic source moves.

An input seismic image may be formed by combining the seismic traces recorded at a plurality of seismic receiver locations (206, 208) and generated by the activation of a seismic source at a plurality of seismic source locations (202, 204), in accordance with one or more embodiments. In accordance with one or more embodiments, the five-dimensional volume seismic dataset, D, with coordinate axes $(x_s, y_s, x_r, y_r, t)$, may be resorted into a five-dimensional volume seismic dataset, D, with coordinate axes $(x_m, y_m, x_h, y_h, t)$, where $x_m=(x_r+x_s)/2$ and $y_m=(y_r+y_s)/2$ are the surface spatial location equidistant from the seismic source location (204) and the seismic receiver location (208) and where $x_h=(x_r-x_s)/2$ and $y_h=(y_r-y_s)/2$ are the surface spatial separation of the seismic source location (204) from the seismic receiver location (208). A collection of seismic traces that share the same $x_m$ and $y_m$ may be called a "mid-point gather".

Figure 3A:
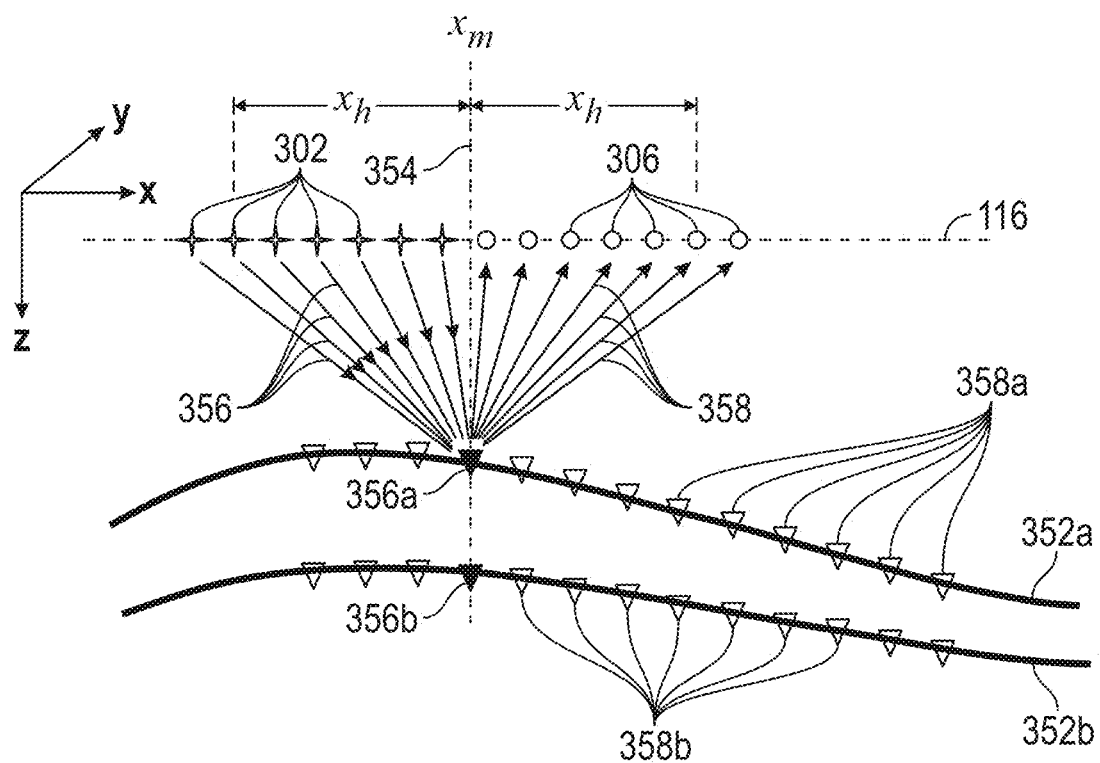
FIGS. 3A and 3B show systems in accordance with one or more embodiments.

FIG. 3A depicts the geometry of a mid-point gather in accordance with one or more embodiments. A mid-point gather may include plurality of seismic source locations (302) and a plurality of seismic receiver locations (306) arranged on the earth's surface (116) around a common mid-point (354). FIG. 3A further shows seismic reflectors (352a, 352b) that may be boundaries between geological layers or may be the upper or lower boundary of a hydrocarbon reservoir, in accordance with one or more embodiments. FIG. 3A also depicts, schematically, the seismic waves (356) radiating from the seismic sources (302) and reflected from the seismic reflector (352a) at a subsurface point (356a) beneath the mid-point (354) and the reflected seismic waves (358) propagating back to the seismic receivers (306). Seismic waves emitted at the seismic source location (302) and detected at a seismic receiver location (306) may be reflected from a plurality of seismic reflectors (352a, 352b) at a plurality of subsurface points (356a, 356b) each at a different depth below the common mid-point (354).

Although FIG. 3A only depicts seismic sources (302) and seismic receivers (306) that lie along a line denoted the x-axis, other seismic sources (302) and seismic receivers (306) displaced along the y-axis may also be included in the mid-point gather. Although all these seismic source locations and seismic receiver locations included in the mid-point gather share the same mid-point ($x_m$, $y_m$) they have different offsets ($x_h$, $y_h$).

Figure 3B:
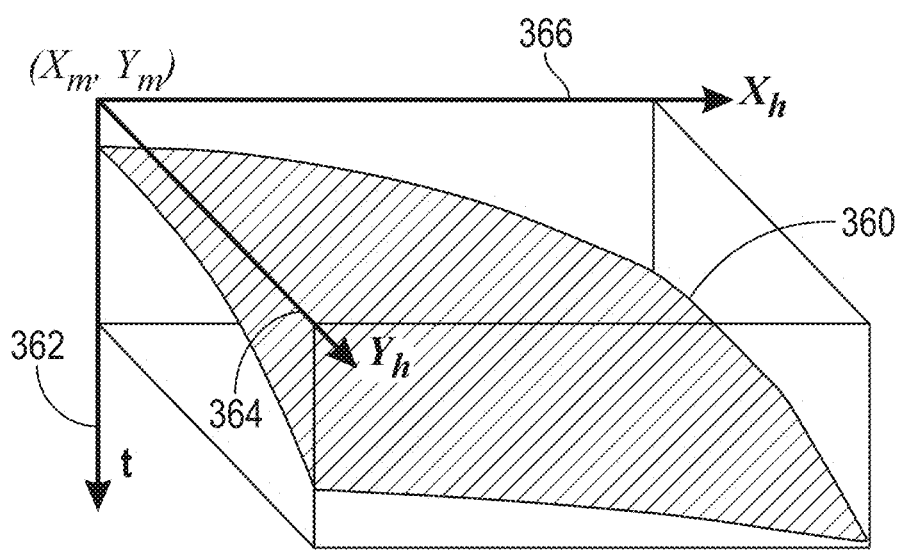

FIG. 3B shows an example of the arrival time, t, (360) of reflected seismic waves as a function of orthogonal offsets, $x_h$ and $y_h$, in accordance with one or more embodiments. The arrival time is indicated on a vertical axis (362) and offset in one direction are indicated on a first horizontal (364) and offset in an orthogonal direction on a second horizontal axis (366). The reflected seismic waves traveling between a seismic source and a seismic receivers with large offsets typically travel a greater distance within the subsurface than reflected seismic waves traveling between a seismic source and a seismic receiver with a small offset and consequently will be detected at a later arrival time at the receiver. This variation of arrival time with offset is typically referred to as "moveout".

FIG. 4A shows a portion of a mid-point gather after moveout correction (400) in accordance with one or more embodiments. Reflected seismic waves recorded at different offsets are typically combined to produce an image of the subsurface. Before they are combined, reflected seismic waves recorded on a seismic trace at different offsets may require moveout correction to ensure that reflections from the same subsurface point (356a) appear on seismic traces recorded at a plurality of offsets at the same arrival time. The methods by which moveout correction may be performed include, without limitation, normal moveout correction, dip moveout correction, prestack time migration or prestack depth migration, and any other method of moveout correction familiar to one of ordinary skill in the art.

As noted, FIG. 4A shows a mid-point gather (400) after moveout. The horizontal axis (402) represents offset, $x_h$. The vertical or "applicate" axis (404), $\zeta$, may represent time, t, in accordance with some embodiments and may represent depth, z, in accordance with other embodiments. In FIG. 4A the seismic traces are shown plotted vertically with detected seismic wave amplitude plotted as a horizontal deflection. A first region (410a) shows examples of reflections from a shallow seismic reflector. A second region (410b) shows examples of reflections from a seismic reflector at an intermediate depth. A third region (410c) shows examples of reflections from a deep seismic reflector after moveout.

Moveout-corrected seismic traces, such as those shown in FIG. 4A, may be combined to form a single mid-point image trace. This combination may include summing over offsets ("stacking") to determine a single stacked mid-point seismic trace. A plurality of mid-point image traces, that include reflections from a plurality of reflection points (358a, 358b), may be used to map subsurface reflectors (352a, 352b) within the subsurface.

FIG. 4B shows a two-dimensional (2D) cross-section through a seismic image (420), composed of a plurality of image traces, in accordance with one or more embodiments. The horizontal axis (422) represents mid-point distance $x_m$ and the applicate axis (424), $\zeta$, represents time, t, in some embodiments and depth, z, in other embodiments. Each image trace in the 2D cross-section through the seismic image (420) shown in FIG. 4B represents an image trace formed by combining the seismic traces in a mid-point gather (400). The image trace (426) is formed from the mid-point gather (400) shown in FIG. 4A.

A spatial weighting function, $W_x$, (430) is shown in FIG. 4B, in accordance with one or more embodiment. The spatial weighting function (430) may be used to select a plurality of neighboring seismic gathers in the neighborhood of a central seismic gather (432) and exclude other seismic gathers, such as those beyond the spatial neighborhood of the central seismic gather (432). In some embodiments the spatial weighting function may be smoothly varying, such as a Gaussian function, or an exponential function. In other embodiments, the spatial weighting function may vary discretely, such as a box-car weighting function.

An applicate-weighting function, $W_\zeta$, (434) is shown in FIG. 4B, in accordance with one or more embodiments. The applicate weighting function may be a temporal weighting function if the seismic image (420) is displayed in the time domain, or the applicate weighting may be a depth weighting function if the seismic image (420) is displayed in the depth domain. The applicate weighting function (434) may be used to select a portion of each image trace (426) and exclude other portions of image traces, such as those beyond the extent of the center (436) of the applicate weighting function. In some embodiments the applicate weighting function may be smoothly varying and in other embodiments the applicate weighting function may vary discretely. The spatial weighting function and the applicate weighting function may have the same function form in some embodiments and may have different functional forms in other embodiments.

In accordance with one or more embodiments, the spatial weighting function (430) and the applicate weighting function (434) may delineate a weighted seismic window (438) of the seismic dataset. Denoting a seismic dataset as denoted $D(x_m, x_h, \zeta)$, where $x_m=(x_m, y_m)$ is a vector denoting the mid-point and where $x_m=(x_h, y_h)$ is a vector denoting the offset, a seismic gather window, R, may be defined as:

$$R(x_m, x_h, \zeta, x', \zeta') = W\zeta(\zeta')W_x(x')D(x_m, x_h, \zeta) \qquad \text{Equation (1)}$$

Within the seismic gather window (438) the average slope vector or "geological dip", s. FIG. 4B depicts the geological dip of seismic reflections within the seismic gather window (438) with a double-headed arrow (440). In some embodiments the geological dip determined from a pre-existing geological dip model, in other embodiments the geological dip may be determined from the seismic image (420), and in still other embodiments the geological dip may be determined from boreholes drilled in the neighborhood of the seismic image.

In accordance with one or more embodiments, a shifted gather window, R', may be determined as:

$$R'(x_m, x_h, \xi, x', \xi') = \frac{1}{n}\sum_i R(x_m, x_h, \xi_m - s \cdot (x_m - x'_i), x'_i, \xi') \qquad \text{Equation (2)}$$

where n denotes the number of seismic traces within the seismic gather window and $\zeta_m$ indicates the applicate value recorded at the central seismic gather.

The process described previously for determining a shifted gather window may be repeated for a plurality of spatial weighting functions, enumerated with the index, i, or a plurality of applicate weighting functions, enumerated with the index, j, or both.

A noise-attenuated central seismic gather, $R^\dagger$, may be determined by combining a plurality of shifted gather windows by reversing the spatial and applicate weighting functions and stacking the seismic traces as:

$$R^\dagger(x_m,x_h,\zeta)=\Sigma_{i,j}W_\zeta^\dagger(\zeta')W_x^\dagger(x'_m)R'(x_m,x_h,\zeta,X'i,\zeta_j') \quad \text{Equation (3)}$$

where $W_\zeta^\dagger$ is the inverse, or the adjoint, of the applicate weighting function, $W_\zeta$, and $W_x^\dagger$ is the inverse, or the adjoint, of the spatial weighting function, $W_x$. The noise-corrected central seismic gathers resulting from this process exhibit higher signal-to-noise ratios than the original moveout-corrected central seismic gathers.

Figure 5:
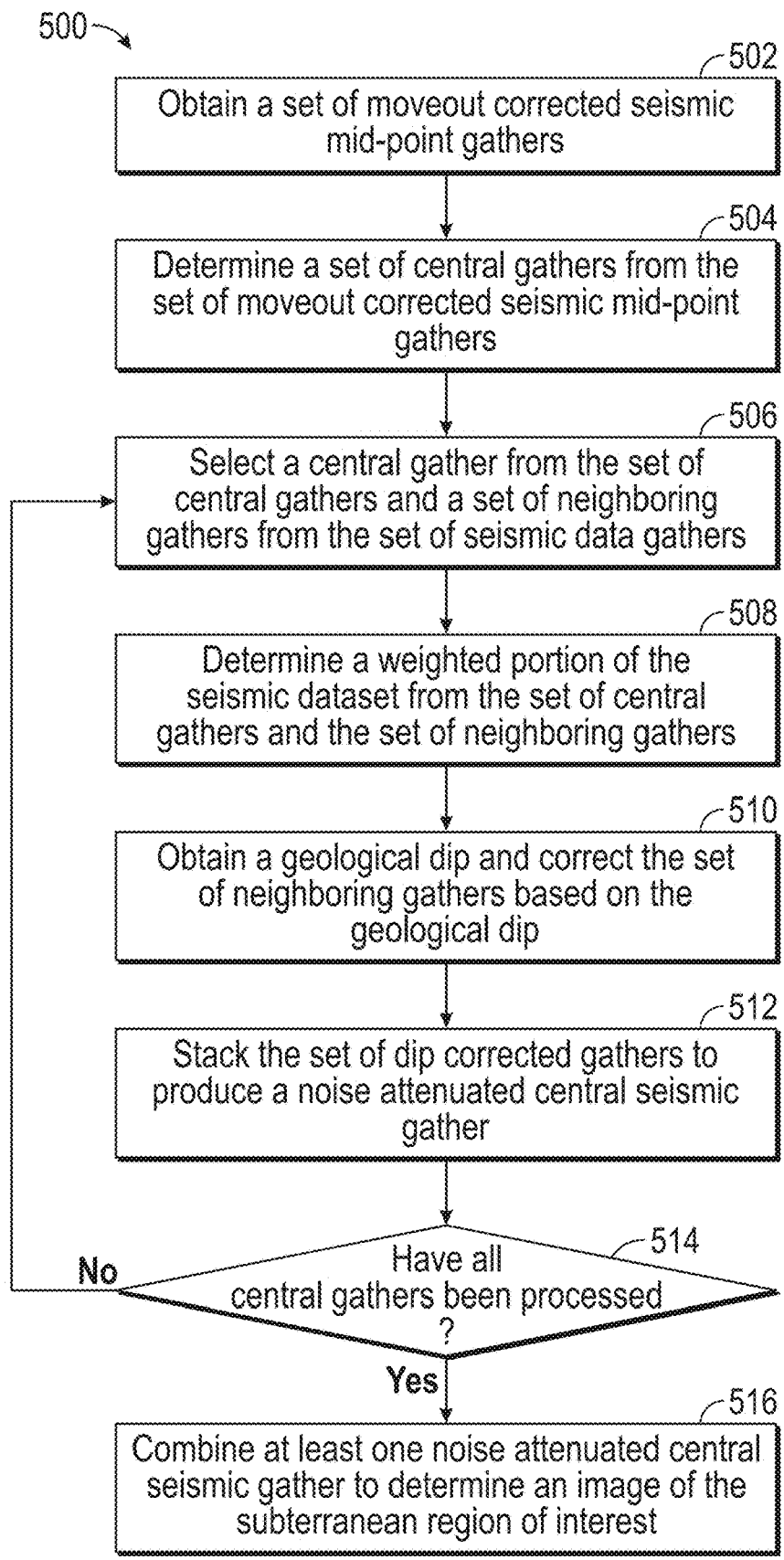
FIG. 5 shows a flowchart in accordance with one or more embodiments.

FIG. 5 illustrates a flowchart (500) in accordance with one or more embodiments. In Step 502 a set of moveout-corrected seismic mid-point gathers may be obtained from a seismic dataset acquired for a subterranean region of interest. The seismic reflections from common seismic reflection points are located at the same recording time for all offsets within the moveout-corrected seismic mid-point gathers.

In Step 504 a set of central gathers from the set of moveout-corrected seismic mid-point gather may be determined. In accordance with some embodiments all moveout-corrected seismic mid-point gather may be included in the set of central gathers. In other embodiments the set of central gathers may be a subset of the set of all moveout-corrected seismic mid-point gather.

In Step 506 a first central gather may be selected from the set of central gathers and a set of neighboring gathers may be selected from the set of moveout-corrected seismic mid-point gathers whose mid-points lie in a vicinity surround the central mid-point gather.

In Step 508 a seismic gather window may be determined from the set of central gathers and the set of neighboring gathers using a spatial weighting function (430) and an applicate weighting function (434).

In Step 510 a local geological dip may be determined for the seismic gather window. In some embodiments, the local geological dip may be obtained from a pre-existing geological dip model. In other embodiments the local geological dip may be obtained from the seismic gather window or from boreholes in the vicinity of the central seismic gather. Further, in Step 510 each member of the set of neighboring seismic gathers may be corrected for the local geological dip. The correction for the local geological dip may cause a change in the arrival time of seismic reflections recorded in the seismic gather window to align a seismic reflection in neighboring seismic gathers at the same time.

In Step 512 a noise attenuated central seismic gather may be determined by stacking the set of dip-corrected neighboring gathers and the central seismic gather. The stacking may be performed may be performed by calculating a mean, weighted-mean, trimmed-mean, median or any other method of calculating an average of seismic traces on a sample by sample basis familiar to one of ordinary skill in the art, without departing from the scope of the invention.

In Step 514, in accordance with one or more embodiments, it is determined if all the gathers in the set of central gathers have been processed. If unprocessed central seismic gather remains, then a new central seismic gather may be selected and Steps 508, 510, 512 and 514 may be repeated with the newly selected central seismic gathers.

If all the central seismic gathers have been processed an image of the subterranean region of interest may be generated in Step 516 by combining at least one noise attenuated central seismic gather using the inverse or adjoint of the spatial weighting function and the inverse or adjoint of the applicate weighting function.

Figure 6C:
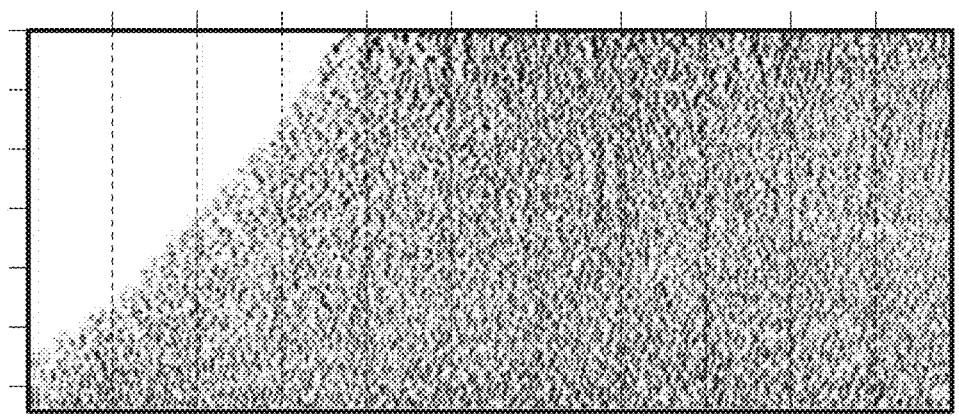
FIGS. 6A-6C show seismic mid-point gathers in accordance with one or more embodiments.
Figure 6B:
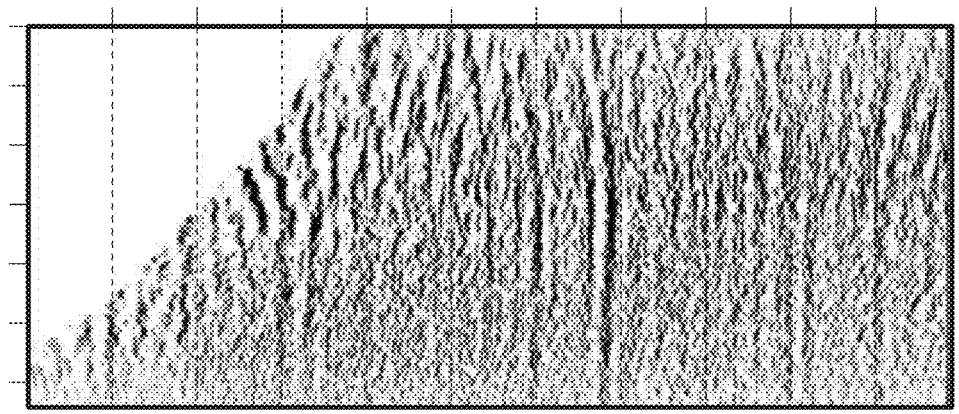
Figure 6A:
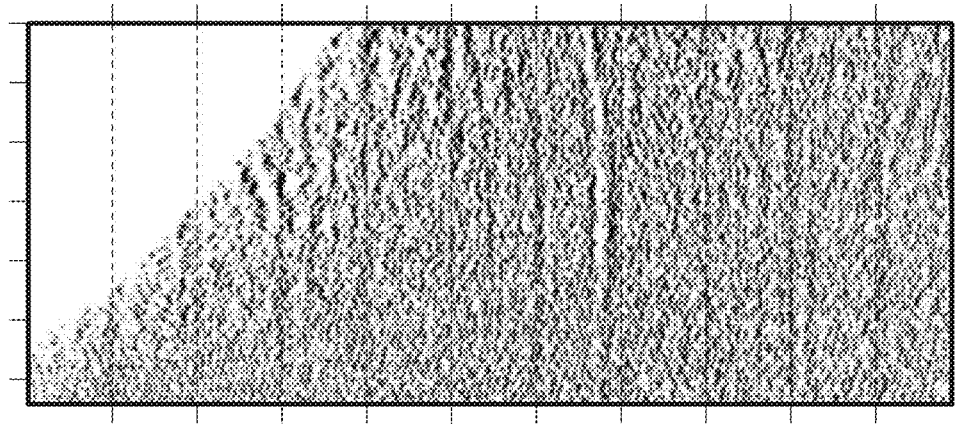

FIGS. 6A-6C, 7A-7C and 8A-8C illustrate the application of the workflow described in FIG. 5 to an exemplary seismic dataset. FIG. 6A shows a moveout-corrected seismic mid-point gather (602) that may form the input to Step 502 of FIG. 5. FIG. 6B shows the noise attenuated central seismic gather (604) generated from moveout-corrected seismic mid-point gather (602) using workflow (500), and FIG. 6C shows the difference (606) between the moveout-corrected seismic mid-point gather (602) and the noise attenuated central seismic gather (604). It will be readily apparent to one of ordinary skill in the art that the noise attenuated central seismic gather (604) is noticeably less noisy than the moveout-corrected seismic mid-point gather (602) from which it was derived.

Figure 7A:
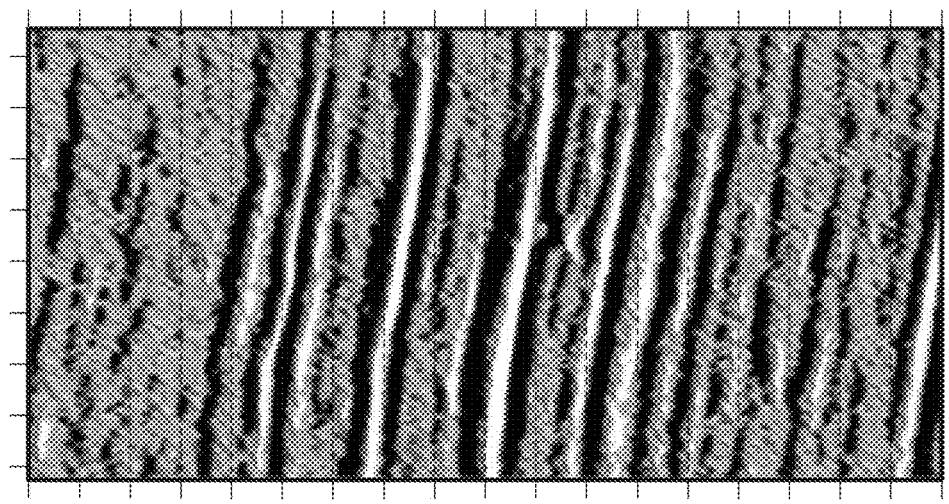
FIGS. 7A-7C show seismic images in accordance with one or more embodiments.
Figure 7B:
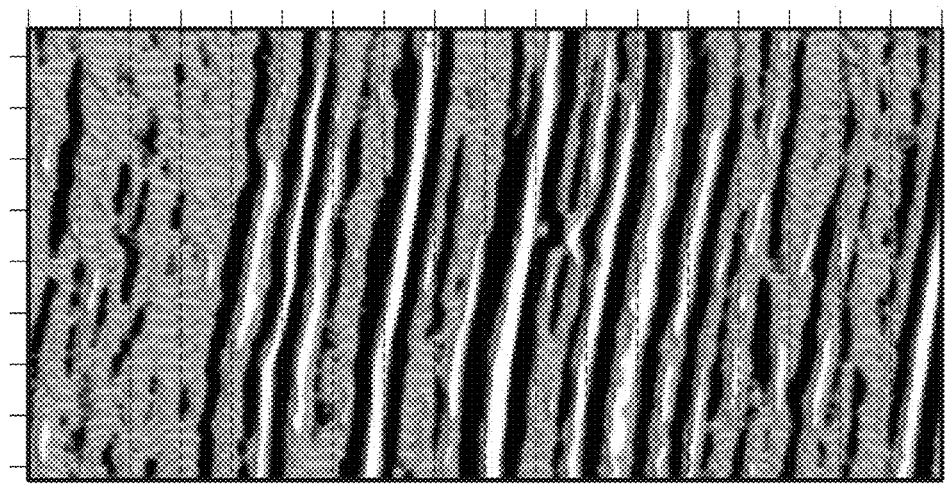
Figure 7C:
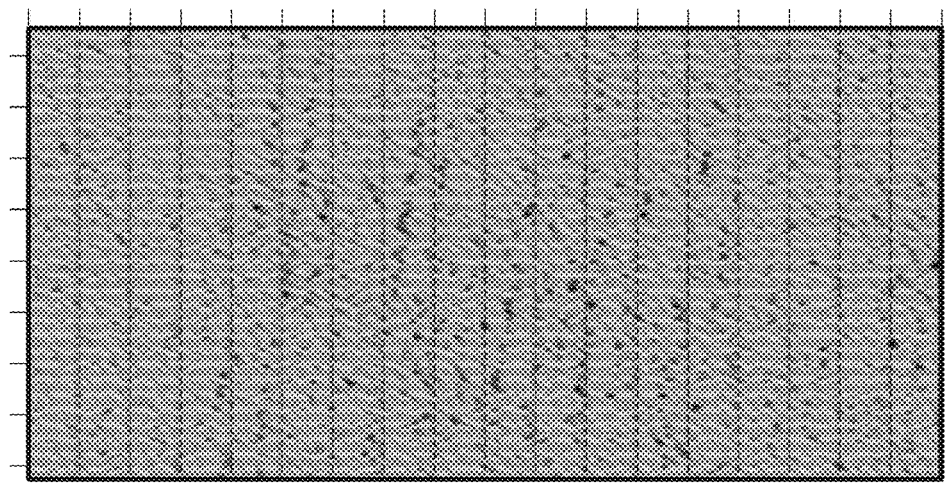

FIG. 7A shows a 2D cross-section through a seismic image (702) generated without the use of the workflow depicted in FIG. 5. The seismic image (702) may be generated from a plurality of moveout-corrected seismic mid-point gathers (602). FIG. 7B shows a 2D cross-section through a noise attenuated seismic image (704) generated from a plurality of noise attenuated central seismic gathers (604). The noise attenuated seismic image (704) may be generated from a plurality of moveout-corrected seismic mid-point gathers (604) using workflow (500). FIG. 7C shows the difference between seismic image (702) and noise attenuated seismic image (704). It will be readily apparent to one of ordinary skill in the art that noise attenuated seismic image (704) is noticeably less noisy than seismic image (702), and the difference seismic image (706) is composed mainly of random noise.

Figure 8C:
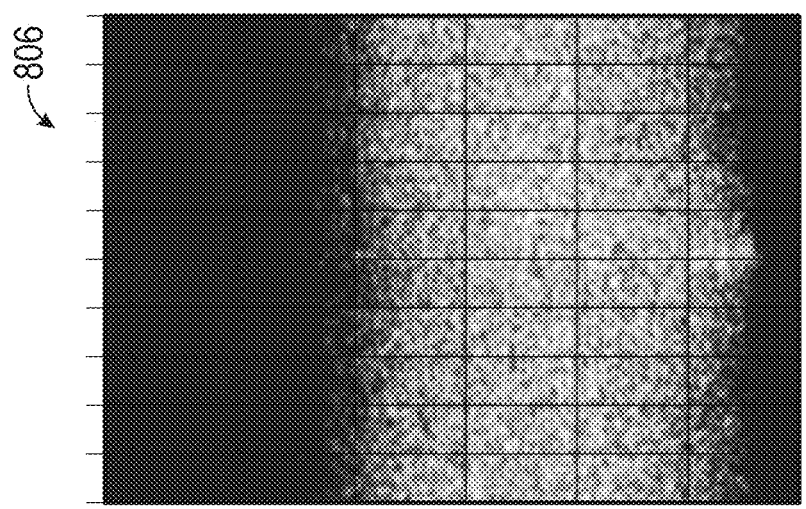
FIGS. 8A-8C show frequency-wavenumber spectra in accordance with one or more embodiments.
Figure 8B:
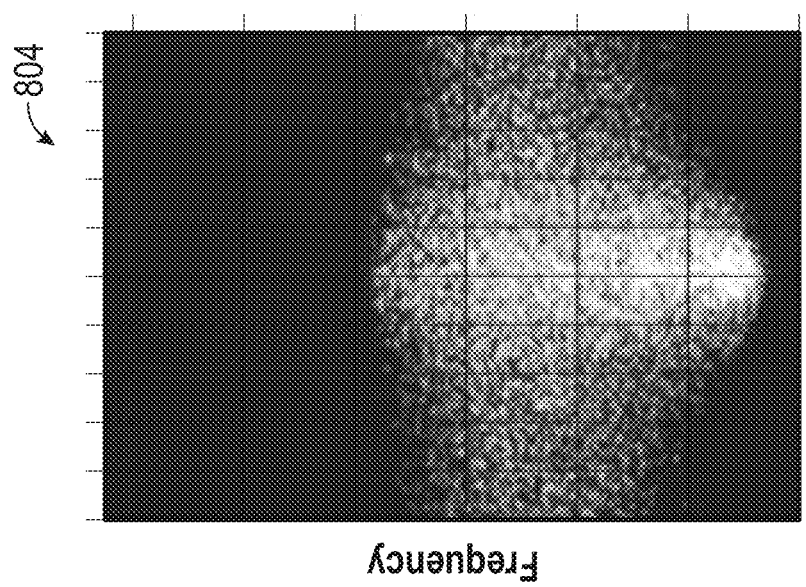
Figure 8A:
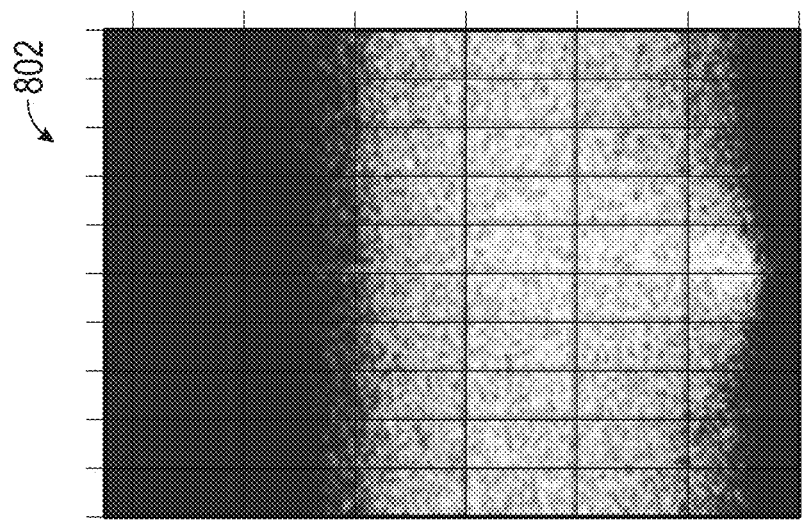

FIG. 8A shows the frequency-wavenumber spectrum (802) of seismic image (702), FIG. 8B shows the frequency-wavenumber spectrum (804) of noise attenuated seismic image (704), and FIG. 8C shows the difference between frequency-wavenumber spectrum (802) and frequency-wavenumber spectrum (804). It will be readily apparent to one of ordinary skill in the art that the difference frequency-wavenumber (806) is composed mainly of random noise.

Figure 9:
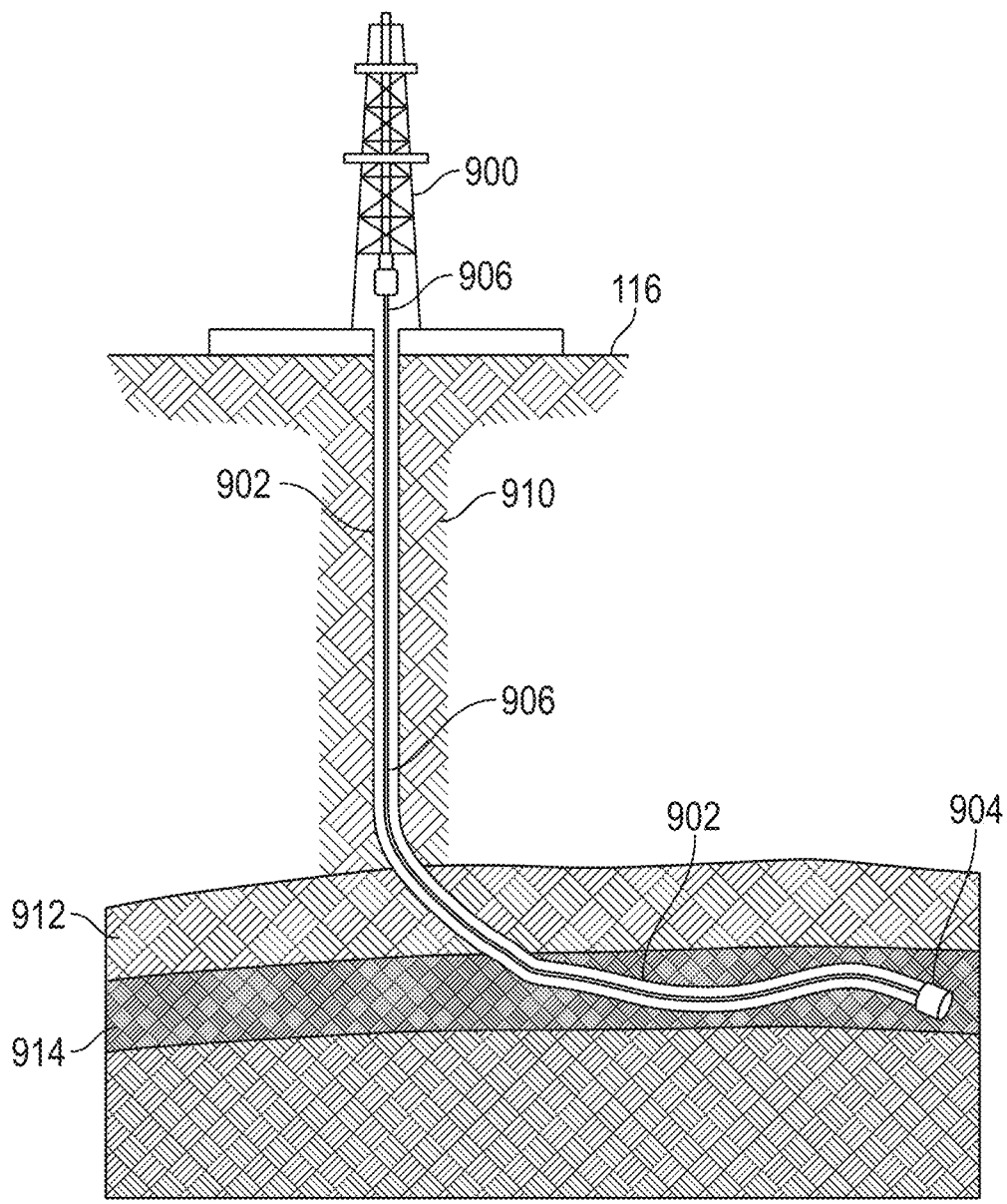
FIG. 9 shows a drilling system in accordance with one or more embodiments.

FIG. 9 illustrates systems in accordance with one or more embodiments. As shown in FIG. 9, a well (902) may be drilled by a drill bit (904) attached by a drillstring (906) to a drill rig (908) located on the Earth's surface (116). The well may traverse a plurality of overburden layers (910) and one or more cap-rock layers (912) to a hydrocarbon reservoir (914). In accordance with one or more embodiments, the noise attenuated seismic image (704), may be used to identify portions of the subsurface with a likelihood of a presence of a hydrocarbon reservoir (914) and to plan the trajectory of the well (902). In some embodiments the trajectory of the well (902) may be straight and in other embodiments, the trajectory of the well (902) may be curved.

Figure 10:
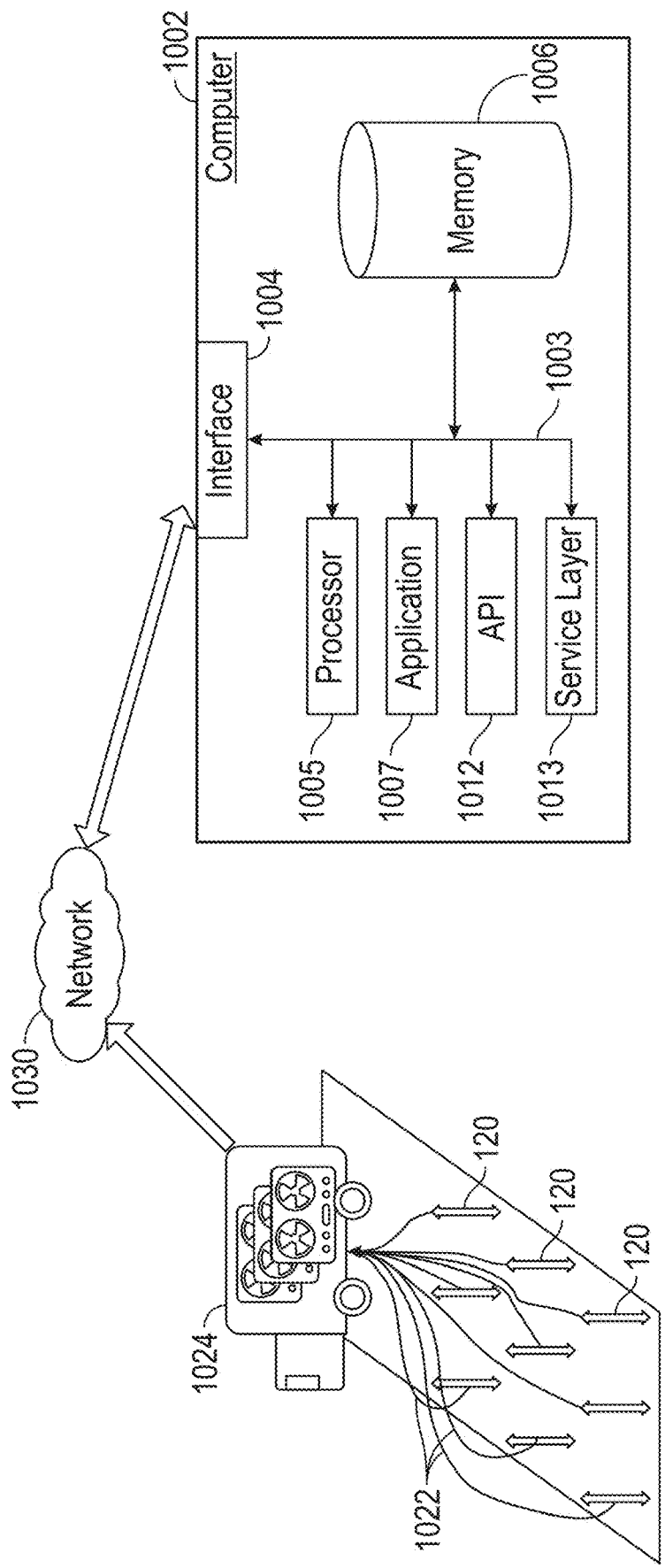
FIG. 10 shows a seismic acquisition and processing system in accordance with one or more embodiments.

FIG. 10 shows a seismic recording and processing system, in accordance with one or more embodiments. The data recorded by a plurality of seismic receivers (120) may be transmitted to a seismic recording facility (1024) located in the neighborhood of the seismic survey (100). The seismic recording facility may be one or more seismic recording trucks (1024). The plurality of seismic receivers (120) may be in digitally or analogic telecommunication with the seismic recording facility (1024). The telecommunication may be performed over telemetry channels (1022) that may be electrical cables, such as coaxial cables, or may be performed wireless using wireless systems, such as Wi-Fi or Bluetooth. Digitization of the seismic data may be performed at each seismic receiver (120), or at the seismic recording facility (1024), or at an intermediate telemetry node (not shown) between the seismic receiver (120) and the seismic recording facility (1024).

The seismic data may be recorded at the seismic recording facility (1024) and stored on non-transitory computer memory. The computer memory may be one or more computer hard-drives, or one or more computer memory tapes, or any other convenient computer memory media familiar to one skilled in the art. The seismic data may be transmitted to a computer (1002) for processing. The computer (1002) may be located in or near the seismic recording facility (1024) or may be located at a remote location, that may be in another city, country, or continent. The seismic data may be transmitted from the seismic recording facility (1024) to a computer (1002) for processing. The transmission may occur over a network (1030) that may be a local area network using an ethernet or Wi-Fi system, or alternatively the network (1030) may be a wide area network using an internet or intranet service. Alternatively, seismic data may be transmitted over a network (1030) using satellite communication networks. Most commonly, because of its size, seismic data may be transmitted by physically transporting the computer memory, such as computer tapes or hard drives, in which the seismic data is stored from the seismic recording facility (1002) to the location of the computer (1002) to be used for processing.

FIG. 10 further depicts a block diagram of a computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining an image of a subterranean region of interest, comprising:
    obtaining a seismic dataset for the subterranean region of interest;
    obtaining a geological dip model for the subterranean region of interest;
    determining, using a computer processor, a set of input seismic gathers from the seismic dataset;
    selecting, using the computer processor, a central seismic gather and a set of neighboring seismic gathers in a vicinity of the central seismic gather from the set of seismic gathers;
    determining, using the computer processor, a set of dip-corrected neighboring seismic gathers by:
        dividing the set of neighboring seismic gathers into a plurality of seismic gather windows,
        determining a local geological dip for each seismic gather window from the geological dip model,
        determining an applicate shift for each of the plurality of seismic gather windows based, at least in part, on the local geological dip,
        determining a plurality of shifted gather windows by shifting at least some of the plurality of seismic gather windows along an applicate axis based on the applicate shifts, and
        forming the set of dip-corrected neighboring seismic gathers by combining the set of shifted gather windows;
    determining, using the computer processor, a noise-attenuated central seismic gather by combining the dip-corrected neighboring seismic gathers and the central seismic gather; and
    forming, using the computer processor, the image of the subterranean region of interest based, at least in part, on the noise-attenuated central seismic gather.

2. The method of claim 1, further comprising:
    identifying a portion of the subterranean region of interest with a likelihood of containing hydrocarbons based, at least in part, on the image of the subterranean region of interest;
    determining a well path through the subterranean region of interest based, at least in part, on the identified portion of the subterranean region of interest; and
    performing the well path using a drilling system.

3. The method of claim 1, wherein the set of input seismic gathers comprises a set of moveout-corrected common midpoint gathers.

4. The method of claim 1, wherein the applicate axis is a time axis.

5. The method of claim 1, wherein combining the dip-corrected neighboring seismic gathers and the central seismic gather comprises determining a weighted stack of the dip-corrected neighboring seismic gathers and the central seismic gather.

6. The method of claim 1, wherein the geological dip model is determined based, at least in part, on the seismic dataset.

7. A non-transitory computer readable medium storing instructions executable by a computer processor, the instructions comprising functionality for:
    receiving a seismic dataset for the subterranean region of interest;
    obtaining a geological dip model for the subterranean region of interest;
    determining a set of input seismic gathers from the seismic dataset;
    selecting a central seismic gather and a set of neighboring seismic gathers in a vicinity of the central seismic gather from the set of seismic gathers;
    determining a set of dip-corrected neighboring seismic gathers by:
        dividing the set of neighboring seismic gathers into a plurality of seismic gather windows,
        determining a local geological dip for each seismic gather window from the geological dip model, determining an applicate shift for each of the plurality of seismic gather windows based, at least in part, on the local geological dip, determining a plurality of shifted gather windows by shifting at least some of the plurality of seismic gather windows along an applicate axis based on the applicate shifts, and forming the set of dip-corrected neighboring seismic gathers by combining the set of shifted gather windows;

determining a noise-attenuated central seismic gather by combining the dip-corrected neighboring seismic gathers and the central seismic gather; and forming the image of the subterranean region of interest based, at least in part, on the noise-attenuated central seismic gather.

8. The non-transitory computer readable medium of claim 7, further comprising:

identifying a portion of the subterranean region of interest with a likelihood of containing hydrocarbons based, at least in part, on the image of the subterranean region of interest; and determining a well path through the subterranean region of interest based, at least in part, on the identified portion of the subterranean region of interest.

9. The non-transitory computer readable medium of claim 7, wherein the set of input seismic gathers comprises a set of moveout-corrected common midpoint gathers.

10. The non-transitory computer readable medium of claim 7, wherein the applicate axis is a time axis.

11. The non-transitory computer readable medium of claim 7, wherein combining the dip-corrected neighboring seismic gathers and the central seismic gather comprises determining a weighted stack of the dip-corrected neighboring seismic gathers and the central seismic gather.

12. The non-transitory computer readable medium of claim 7, wherein the geological dip model is determined based, at least in part, on the seismic dataset.

13. A system for forming an image of a subterranean region of interest, comprising:

a seismic source to emit a radiated seismic wave;

a plurality of seismic receivers for detecting and recording an observed seismic dataset generated by the radiated seismic wave; and a seismic processor configured to:

receive a seismic dataset for the subterranean region of interest;

obtain a geological dip model for the subterranean region of interest;

determine a set of input seismic gathers from the seismic dataset;

select a central seismic gather and a set of neighboring seismic gathers in a vicinity of the central seismic gather from the set of seismic gathers;

determine a set of dip-corrected neighboring seismic gathers by:

dividing the set of neighboring seismic gathers into a plurality of seismic gather windows, determining a local geological dip for each seismic gather window from the geological dip model, determining an applicate shift for each of the plurality of seismic gather windows based, at least in part, on the local geological dip, determining a plurality of shifted gather windows by shifting at least some of the plurality of seismic gather windows along an applicate axis based on the applicate shifts, and forming the set of dip-corrected neighboring seismic gathers by combining the set of shifted gather windows;

determine a noise-attenuated central seismic gather by combining the dip-corrected neighboring seismic gathers and the central seismic gather; and form the image of the subterranean region of interest based, at least in part, on the noise-attenuated central seismic gather.

14. The system of claim 13, wherein the seismic processor is further configured to:

identify a portion of the subterranean region of interest with a likelihood of containing hydrocarbons based, at least in part, on the image of the subterranean region of interest; and determine a well path through the subterranean region of interest based, at least in part, on the identified portion of the subterranean region of interest.

15. The system of claim 13, wherein the set of input seismic gathers comprises a set of moveout-corrected common midpoint gathers.

16. The system of claim 13, wherein the applicate axis is a time axis.

17. The system of claim 13, wherein combining the dip-corrected neighboring seismic gathers and the central seismic gather comprises determining a weighted stack of the dip-corrected neighboring seismic gathers and the central seismic gather.

18. The system of claim 13, wherein the geological dip model is determined based, at least in part, on the seismic dataset.

* * * * *